Patented Nov. 24, 1936

2,062,251

UNITED STATES PATENT OFFICE 2,062,251

SYSTEM OF AUTOMATIC INTEGRATING CONTROL

Anita S. Reynolds, Greenwich, Conn.

Application June 30, 1932, Serial No. 620,143

38 Claims. (Cl. 236—70)

This invention relates to improvements in measuring methods and apparatus, and particularly to improvements in the methods and apparatus described in my Patent No. 1,851,596.

In said patent I have described a measuring system and structures in which I compensate for hysteresis and anticipate abnormal changes by introducing a certain correction factor when a predetermined change takes place in the system as a result of stresses applied thereto. However, while I have provided means for adapting the system to a wide variety of uses, e. g., by changing the cutting of cams, once adjusted the correction was applied irrespective of the rate of the change.

Automatic measuring or control systems are usually designed to take account only of the deviation from a normal, with no reference to the amount of time consumed in producing such deviation, nor to the part of the scale in which the deviation takes place, nor to the inherent nature of the substance being acted upon, which may require different rates of compensation or correction in various parts of the scale.

It is a feature of my invention to determine the amount of deviation taking place in one unit of time and the position on the scale in which such deviation occurs. These factors, when transmitted to an indicating or control mechanism, will correct for the deviation from a desired value or normal schedule, as well as for hysteresis, they will anticipate abnormal deviations, and so keep nearer to an ideal normal schedule.

In certain applications of this invention it is of great importance to take into account the rate element in conjunction with the time element. For instance, when the measuring or controlling apparatus is responding to temperature changes, a different correction may be needed when, for example, the increase is 5° plus in one minute than when it is 5° plus in five minutes. Likewise the part of the scale where the correction is taking place may be of importance. A different correction may be needed for 5° plus in one unit of time when such change is taking place, let us say, halfway between the normal and the maximum temperatures, than would be necessary if a similar change took place close to the normal.

Electrical, physical or chemical properties inherent in the element controlled may make it necessary to correct and anticipate more or less rapidly or radically in various parts of the scale. For example, halfway between normal and the maximum temperatures or other stresses may constitute a danger zone for a particular material or process. A condition may arise which would require stronger corrective and anticipatory measures at a critical point than even a more advanced position on the scale would require. A feature of this invention provides for the automatic application of corrective and anticipatory measures of varying intensities in different parts of the scale.

For the purposes of this application I have illustrated three forms of the invention. The first two forms are applied to a conventional type of heat responsive mechanism similar to the one disclosed in the U. S. Patent No. 1,125,699, issued January 19, 1915. The clutch shown in Fig. 3 is illustrated and described in my joint patent with J. N. Reynolds, No. 1,771,352, dated July 22, 1930. The manner in which a recording device can be used to control as well as record temperatures is well known to those skilled in the art. Illustrative of such double or alternative use is Patent No. 1,713,771 to A. R. Melching of May 21, 1929.

The invention is not limited to any of these forms of mechanisms, nor to the control of temperatures or pressures. It is applicable to any type of controlling, recording or measuring system for physical, electrical or chemical quantities, irrespective of the form of the indicating, recording or controlling mechanism. The choice of the controlling, recording or indicating mechanism and the magnitude of the rate of anticipatory or hysteresis control will depend upon the nature of the scientific or industrial problem to be solved.

Broadly speaking, existing measuring or control systems consist of a designating or testing device which indicates the amount of deviation, and a recording or control device which is automatically adjusted in accordance with the operation of the testing device. For purposes of simplification I designate the first of the above mentioned functions or devices as the input and the second as the output.

In one embodiment of my invention I interpose between the input and the output a mechanism consisting of the following parts:

A first means, such as a wheel which is moved in accordance with the indications produced by the input;

A second means such as a cam, specially cut in accordance with the needs and nature of the particular elements under control. This cam is in fixed relation to said wheel;

A third member, such as a link or a disc which is periodically coupled to said wheel, and is moved by it. Upon the completion of the movement of the wheel, the disc is disengaged and returned to its original position. This may be termed a counting off member since during each cycle of operation it counts off the number of degrees or units of change in any one unit of time; in other words, it measures the rate of change and adjusts the fourth member accordingly.

Fourth, a second cam also specially cut in accordance with the needs and nature of the particular process or elements under control to complement the correction factor introduced by the second means, depending on the rate at which the conditions are changing. This second cam is engaged by the third member, and through the return movement thereof is displaced a distance equal to the distance moved by the third member upon its return to normal. In this embodiment the second cam is allowed to remain in that position until the next cycle of operations takes place;

In the cutting of the two cams provision is made for the lag of the entire system as well as the nature of the elements under control.

Fifth, associated with each of the two cams is a rider, and attached to each of said riders there is an arm which is associated with a fifth member. This fifth member moves the output in accordance with the result of the combined movements of said riders. The extent of this final movement of the output is therefore the result of a combination or integration of first, the amount of the compensation or anticipation required according to the position on the scale, and second, the amount required in accordance with the number of degrees of change in that unit of time. This member may be termed a mixer or integrating bar or member as it is used for combining or integrating the results of the movements of the riders associated with the two cams in the second and fourth members.

Under certain conditions, the third member or disc may be omitted and the fourth member may be operated directly from the wheel or first member. The fifth member is engaged with the output periodically during the time the wheel and fourth member are operated.

In the majority of control mechanisms the input element tests periodically, the periodicity being an integral part of the input. Where this condition obtains, the fifth member noted above may be permanently attached to the output mechanism.

When the input has no periodicity, i. e., when it is continuously testing, the periodicity must be supplied elsewhere. Under these conditions, it is necessary to connect the mechanism of the invention periodically to the output. This connection is made during the period when the two cams are being moved by the input.

I have shown only sufficient mechanism to illustrate the principles involved and have omitted such parts as are not definitely required to enable one skilled in the art to understand the functions and operation of the devices.

It is to be understood that the conventional forms of cams, drive, clutching, etc., are shown merely to illustrate certain embodiments of the invention, and that these details, as well as others, may be varied without departing from the spirit of the invention defined in the claims.

Referring to the drawings, Fig. 1 shows a schematic drawing of the adaptation of the invention to the types of mechanism where the testing is done periodically and the timing is a function of the input element. In this form the integrating arm is permanently attached to the output element;

Fig. 2 is a schematic drawing of the adaptation to those types where it is desirable to associate the integrating mechanism with the output element periodically during the intervals when the two cams are being set;

Fig. 3 is a schematic drawing of the adaptation to those types of mechanism where the testing operation is continuous. Under these conditions the integrating mechanism is associated with the output elment periodically while the two cams are being set. During this period operating power is removed from the testing element. The periodicity is supplied from the power source which drives the operating cam shaft of the integrating mechanism.

Figure 1:
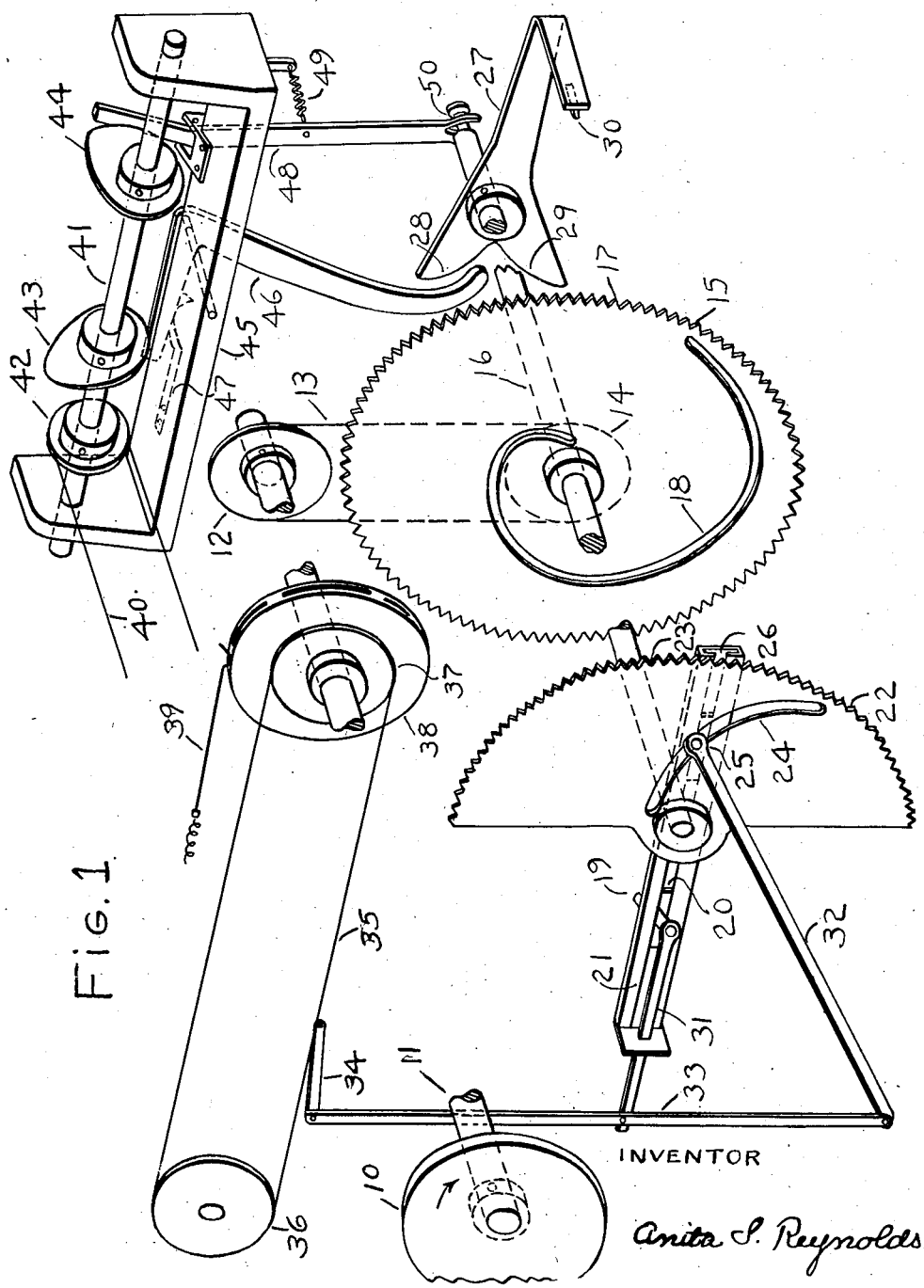
Figure 2:
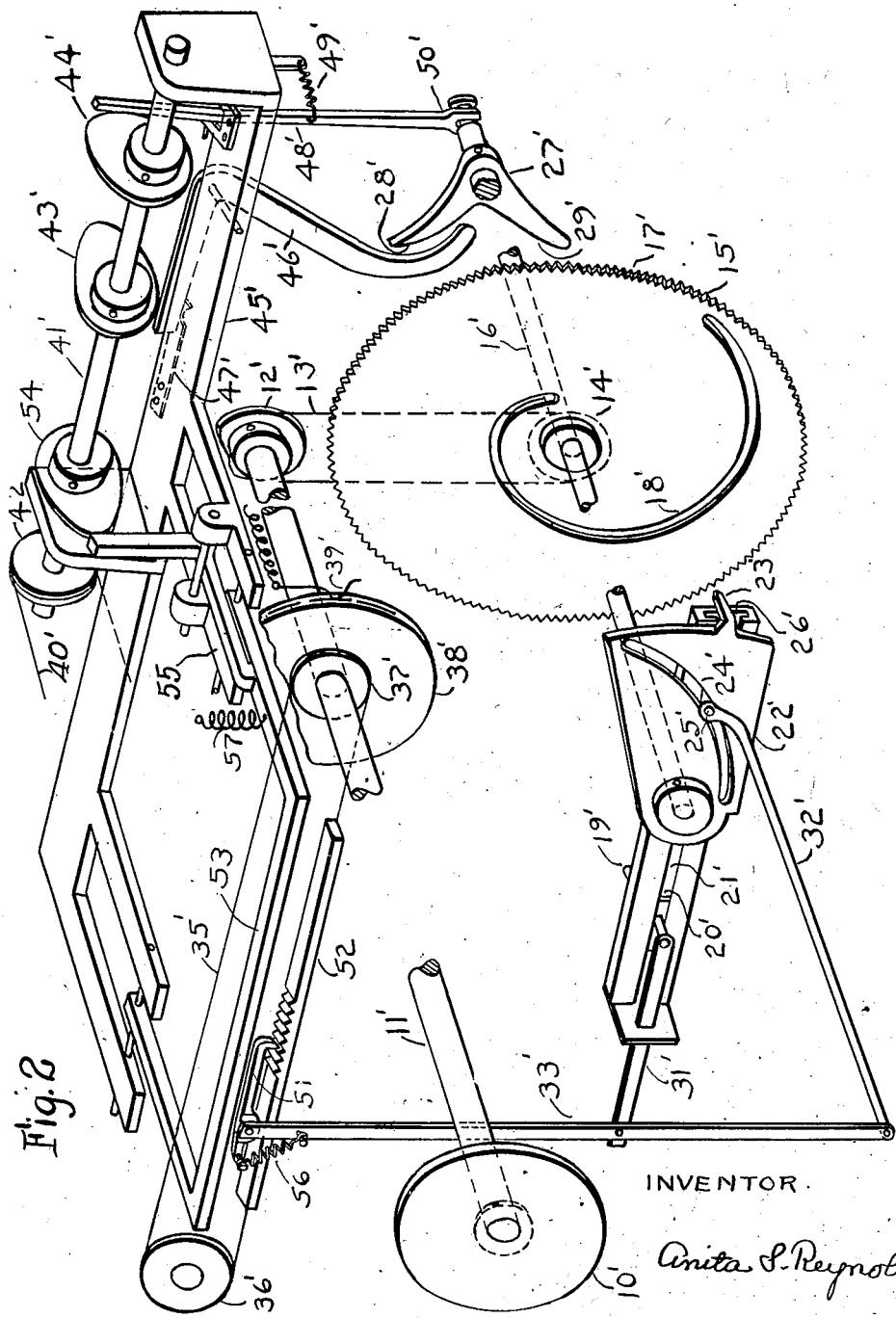
Figure 3:
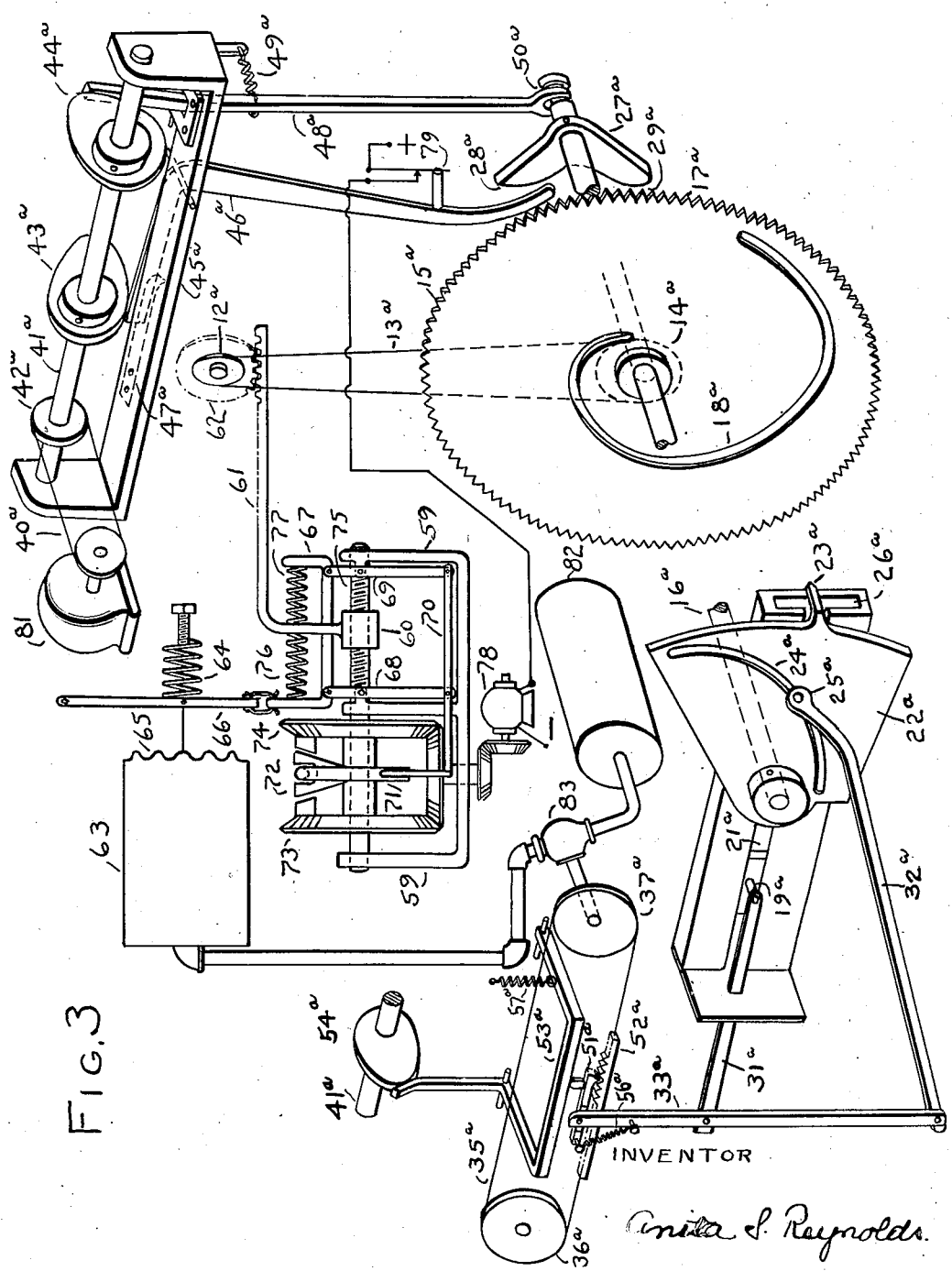

In all of the above figures, for clarity of illustration the various parts are shown separated, but in operation it is to be understood that they will be in close relation; e. g., shaft 16 will only be long enough to have 27 pinned to it, 15 free to rotate, and in Fig. 1, 22 free to rotate. 22' and 22ᵃ will be pinned to 16 in Figs. 2 and 3. In Figs. 1 and 2, output 38 and output 38' are shown free to rotate on shaft 11 and 11', respectively, but are mounted in this position for illustration only, as they may be mounted in any convenient position.

Referring to Fig. 1, the input mechanism is represented by the disc 10 attached to shaft 11 which has attached to the other end sprocket 12. Passing over 12 is a chain 13 which rotates sprocket 14 at the same ratio as 10 is rotated by the input mechanism. 14 is attached to wheel 15 which revolves freely on shaft 16 and has on its periphery clutch teeth 17. Integral with 15 or attached to it is the cam 18 and traveling in 18 is the rider 19 which is caused to follow a straight line movement by the plate 20 sliding in the guides 21.

Shaft 16 supports on its forward end segment 22 which is free to rotate and has on its periphery clutch teeth 23. Attached or integral with it is cam 24, and traveling in 24 is the rider 25 which, with its attached plate, slides in guides 26.

The other end of shaft 16 has attached segment 27 which has at one end two restoring cams 28 and 29 and carries at the outer end clutch tooth 30.

Rider 19 has attached to it arm 31 and rider 25 has attached to it arm 32. 31 and 32 have pivoted to them lever 33 which has pivoted at its upper end arm 34, which in turn is attached to chain 35, passing over idler 36 and driving sprocket 37, which is attached to 38, the output mechanism. This output, in the form illustrated, is a rheostat loosely mounted on shaft 11 and cooperating with a contact brush 39.

The timing in this embodiment is obtained from a timed shaft in the input by chain 40 driving shaft 41 through sprocket 42. Attached to 41 are two operating cams 43 and 44. Pivoted to frame 45 is a restoring lever 46, held in the unoperated position by spring 47 and operated by cam 43. The lower end of 46 cooperates with cam surfaces 28 or 29 to restore 27 to a normal position.

Also pivoted to frame 45 is a lever 48 held in the unoperated position by spring 49. The upper end of 48 engages with cam 44 and the lower forked end 50 serves to move shaft 16 longitudinally.

In Fig. 2 the input is represented by disc 10' attached to shaft 11', with sprocket 12' attached to the other end. The chain 13' connects 12' and 14' to rotate wheel 15' with cam 18'. The rider 19' travels in cam 18' and plate 20' slides in guides 21'.

Shaft 16' has attached to its forward end segment 22' with clutch tooth 23'; also integral with 22' is cam 24'. Traveling in 24' is the rider 25' which with its attached plate, slides in guides 26'. The other end of 16' has attached segment 27' with the two restoring cams 28' and 29'.

Rider 19' has attached arm 31', and 25' has attached arm 32'. 31' and 32' are pivoted to lever 33' which has pivoted at its upper end clutch or ratchet dog 51 engaging with rack 52, which in turn forms a connecting link in chain 35', the latter passing over idler 36' and driving sprocket 37', attached to 38', the output.

The timing in this embodiment is also obtained from a timed shaft in the input by chain 40' driving shaft 41' through sprocket 42'. Attached to 41' are two operating cams 43' and 44'. Pivoted to frame 45' is a restoring lever 46' held in the unoperated position by spring 47' and operated by cam 43'. The lower end of 46' engages with either of cam surfaces 28' or 29' to restore 27'.

Also pivoted to 45' is a lever 48' held in the unoperated position by spring 49'. The upper end of 48' engages with cam 44' and the lower forked end 50 serves to move 16' in a longitudinal direction.

Lever 53 also pivoted to 45', is arranged to cause engagement between dog 51 and rack 52 when cam 54 operates lever 55 to depress 53. Spring 56 restores 51 and spring 57 restores lever 53 when cam 54 releases lever 55.

In Fig. 3 the input is produced by the movement of the nut 60 with the attached rack 61, which rotates 15ᵃ through chain 13ᵃ, sprocket 12ᵃ, sprocket 14ᵃ and gear wheel 62. Nut 60 is caused to move forward and back by changes in pressure in tank 63, varying from the normal as determined by the tension on spring 64. The diaphragm 65 is connected to lever arm 66. Spring 64 also acts on this lever arm. The lower end of 66 is associated with cradle 67 which is pivoted to lever arms 68 and 69. Also pivoted to 68 and 69 at their lower ends, is cradle 70 which carries at the other end clutch ring 71. The bifurcated end of clutch engaging member 72 engages with the clutch surfaces of either of the two gears 73 and 74 for the purpose of causing shaft 75 to be rotated. This moves nut 60 forward or back, which adds to or subtracts from the tension of 64.

The motor 78 drives gears 73 and 74. The circuit of 78 passes through contacts 79 operated by lever 46ᵃ and cam 43ᵃ which latter is mounted on shaft 41ᵃ. This latter shaft is operated by power source 81 which supplies the necessary timing intervals for the operation of the system. Tank 63 is supplied for purposes of illustration from the supply tank 82 by the opening and closing of throttling valve 83. The balance of the apparatus shown in Fig. 3 operates as described for Fig. 2.

The functions performed are as follows: Referring to Fig. 1, let us assume that the input (e. g., in response to an increase in temperature), causes disc 10 to be rotated in a clockwise direction. This movement will rotate wheel 15 through a corresponding angular movement. During this time the arm 27 is in a position in which tooth 30 engages one of the teeth 17 of the wheel 15. Arm 27 is therefore rotated a distance equal to that of wheel 15. Chain 40 is revolving shaft 41 through a cycle of operations and when cam 44 displaces the upper end of lever 48, causing the forked end 50 to move shaft 16 from right to left, tooth 30 will then be withdrawn from 17 and will engage one of the teeth 23 on segment 22. Immediately following this operation, cam 43 engages the upper end of lever 46, causing the lower end to be thrust into engagement with cam surface 29. This causes the rotation of member 27, whereby shaft 16 will be rotated back to its normal position. Tooth 30 being now engaged with 23, causes segment 22 to be moved from normal a distance equal to the original displacement of wheel 15 and arm 27. At the end of this movement the continued revolution of shaft 41 disengages cam 44 from lever 48, permitting spring 49 to draw shaft 16 back into its original position, disengaging tooth 30 from 23 and reengaging with one of the teeth 17. This part of the apparatus is then ready to repeat its cycle upon the next movement of disc 10.

The displacement of wheel 15 causes rider 19, which travels in cam 18, to be moved away from the center of shaft 16, thus moving arm 33 and lever 34, which in turn through chain 35, rotates sprocket 37 and the output or rheostat 38 in a clockwise direction.

This part of the movement corresponds to the correction for what may be termed the position on the scale. Immediately following this movement, the movement of disc 22 in a counter-clockwise direction causes rider 25, travelling in cam 24, to be moved outwardly, also away from the center of shaft 16, giving an additional movement to arms 33 and 34 and chain 35. which results in a further displacement of the output.

If the initial movement of disc 10 is, for example. 1° in one unit of time, the total movement of rheostat 38 will be relatively small. If, however, a larger displacement of 10 takes place, indicating, for example, 5° in one unit of time, there will be a proportionately greater total displacement of the rheostat with a correspondingly greater corrective action. The operation of the output serves to restore the balance of the galvanometer and to operate the necessary corrective action on the heat supply.

Upon a reduction in temperature and a movement of disc 10 in a counter-clockwise direction, the cams 18 and 24 will be moved in the opposite direction, thus rotating rheostat 38 a greater or lesser amount in a counter-clockwise direction, depending upon the displacement of 10.

It will be seen, therefore, that the displacement of the output rheostat 38 takes place under the control of disc 10 and cams 18 and 24. The cutting of cams 18 and 24 determines the value of the correction factor at various operating stages of the system. Depending on the extent of movement by the input as counted off by wheel 15 and cam 18 in its clockwise or counter-clockwise rotation, segment 22 and cam 24 are also rotated to count off the distance the input (and wheel 15) moves in any one unit of time. Shaft 41 is the time controlled element which controls the selective actuation of 15 and 22. The cutting of cam 24 determines the value of the anticipatory or hysteresis correction factor, depending on the rate per unit of time at which changes occur in the input. Upon the expiration of a certain time interval transmitted from the input mechanism in Fig. 1 to shaft 41, cam 24 is always operated to an extent determined by the displacement of lever 27 from normal, i. e., the extent to which wheel 15 and cam 18 were rotated. Therefore, it will be seen that the final movement of the output depends on the rate as well as the degree of changes in the system. Since through lever 33 the integrated movements of the two cams are transmitted to the rheostat, the latter will be moved periodically (as determined by shaft 41), an amount equal to the algebraic sum of the two movements to correct for minor deviations or to anticipate abnormal changes as the case may be. Furthermore, the cam 18 is so cut as to transmit to the output varying motions in different angular positions of 15, depending on the part of the scale in which the temperature variation occurs. Of course, the cutting of cams 18 and 24 is determined by the operating requirements of the control system. In many cases far more radical corrections may be necessary in a critical part of the scale indicated by the angular position of wheel 15 than at other parts.

Referring to Fig. 2, wheel 15' is displaced by a movement of disc 10', as described for Fig. 1. During this operation segment 22' is in a position to cause tooth 23' to engage with one of the teeth 17', thus 22' is displaced in unison with wheel 15'. During the operation just described, cam 54 has displaced lever 55, which in turn has displaced lever 53, causing dog 51 to engage with rack 52. Therefore, upon the movement of wheel 15', cam 18' displaces rider 19', outwardly causing lever 33' to rotate idler 36' and sprocket wheel 37' in a clockwise direction through the engagement of dog 51 and rack 52. While this movement is taking place there is an additional movement given to lever 33' by the rider 25' traveling in cam 24', causing 25' to be moved outwardly from the center of shaft 16'. This motion gives a movement to lever 33' in addition to that imparted by cam 18'. Following the initial movement of cams 18' and 24', cam 54 releases lever 55, which in turn releases 53, thus permitting dog 51 to disengage from the rack 52, so that upon the restoring movement of segment 22' there will be no movement of the output 38'. At the end of this movement shaft 41' has revolved to a point where 44' moves lever 48', causing the forked end 50' to thrust 16' forward, thus disengaging the tooth 23' from the teeth 17'. Following this movement cam 43' engages with lever 46' and the lower end of 46' engages with cam surface 29', causing shaft 16' to be rotated back to its original position. Since 22' is rigidly connected with shaft 16', it is also rotated back to its starting position at this time and the mechanism is in condition for the next cycle to take place.

In the embodiment illustrated in Fig. 3, the timing of shaft 41ª is derived from a separate power source 81 by means of suitable reduction gearing (not shown) and chain 40ª passing over sprocket 42ª. Assuming now that the function of the apparatus as disclosed is to maintain a definite pressure in tank 63, for example, 100 pounds, spring 64 is adjusted so that with 100 pounds operating on diaphragm 65, lever arm 66 will assume a central position. An increase in pressure in 63 will overcome the tension of spring 64, thrusting diaphragm 65 outwards and causing lever arm 66 to move cradle 67 in a direction away from the gear wheel 74. The lower cradle 70 will be moved towards gear 74 since it is pivoted at the lower end of arms 68 and 69 which are pivoted to the framework 59 on a line central with the shaft 75 and carry cradle 67 pivoted to the upper ends.

The movement of 70 causes ring 71 to thrust clutch member 72 into engagement with the corresponding clutch surface attached to gear 73. This will cause shaft 75 to be revolved in a clockwise direction (looking at the end nearest 73). This in turn causes nut 60 to be moved towards gear 74, compressing spring 76 which acts to aid spring 64 to bring the diaphragm back to a neutral position, thus disengaging the clutch and stopping the movement of 60. The movement of nut 60 causes arm 61 to move gear 62 in a clockwise direction, thus revolving wheel 15ª in the same manner as described for Figs. 1 and 2.

During the movement of 15ª tooth 23ª is in engagement with teeth 17ª, causing segment 22ª to be displaced at the same time and in the same direction. The movement of 15ª causes rider 19ª traveling in cam 18ª to be displaced in a direction away from the center of shaft 16ª, thus moving lever 33ª in a direction to cause tooth 51ª, engaging with rack 52ª, to rotate idler 36ª and sprocket 37ª in a direction to close valve 83, thus reducing the flow of gas or liquid from tank 82 into tank 63. The movement of 22ª causes rider 25ª traveling in cam 24ª to move away from the center line of shaft 16ª, thus imparting an additional movement to lever 33ª. During these movements cam 54ª has held dog 51ª in engagement with rack 52ª through the downward movement of lever 53ª. During the operation of the restoring part of the cycle the contacts 79 are open; therefore the motor 78 is not revolving so that there can be no further displacement of wheel 15ª during the interval that cam 43ª, operating through lever 46ª, is returning segment 22ª to normal position. Also during this period 51ª is out of engagement with 52ª so that there will be no backward displacement of rack 52ª during the restoring part of the cycle as 22ª is returned to normal.

Correspondingly, a decrease in pressure in tank 63 will permit diaphragm 65 to move inwardly, due to the excess of pressure in spring 64. This movement causes clutch 72 to engage with gear wheel 74 rotating in a counter-clockwise direction, and nut 60 will be moved away from gear 74, compressing spring 77 until the balance between the pressure in 63 and spring 64 is restored. This action causes 18ª and 24ª to move in the reverse direction to that described, and valve 83 will be opened to restore the pressure in 63.

Figure 4:
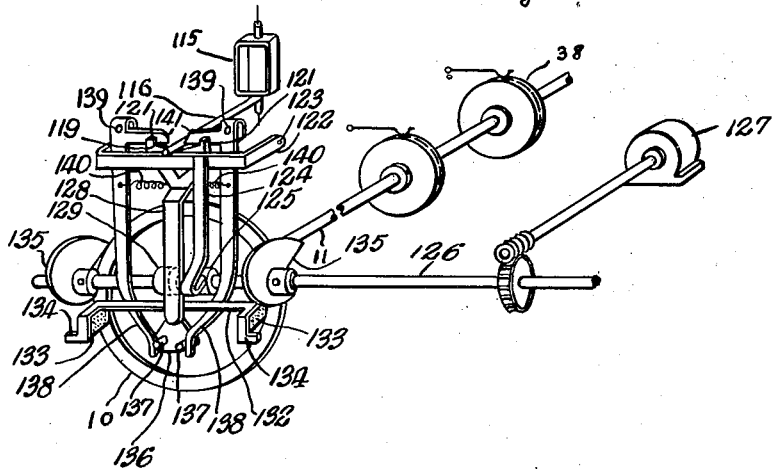
Fig. 4 is a perspective view of a well known thermo-controlling mechanism.

The thermal controlling mechanism indicated as operating discs 10 and 10' of Figs. 1 and 2 is of a well-known type illustrated in detail in Fig. 4. The heat producing and varying means for Figs. 1 and 2 are shown schematically in Fig. 5 as a simple rheostat directly controlling the flow of current in an electric furnace. It is to be understood that these illustrations are for the purpose of full disclosure only and that the invention is not limited to their use, but may be applied to any of the well-known methods or devices for similar purposes.

Figure 5:
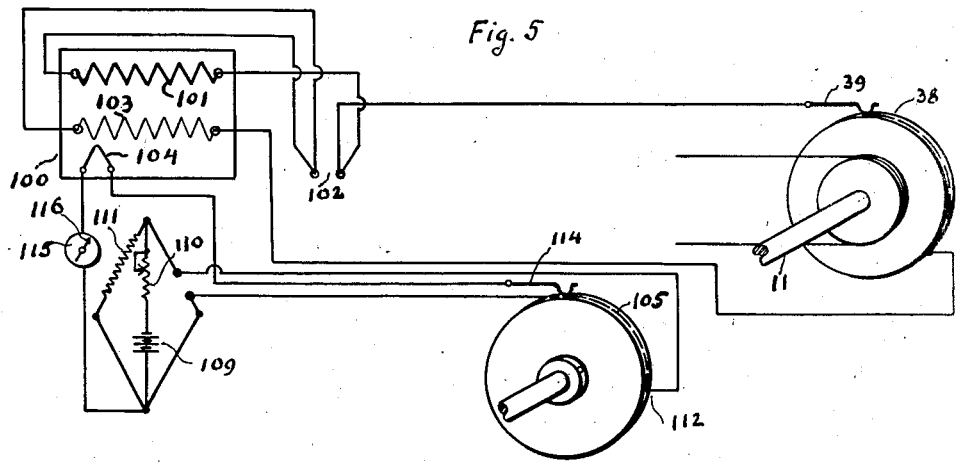
Fig. 5 is a diagrammatic illustration of the circuit arrangement for controlling furnace temperatures.

In Fig. 5 the furnace shown diagrammatically at 100 has a main heating element 101 connected directly across a line 102 so that whenever an operating switch (not shown) is closed, the heating element 101 will be energized. The temperature of the furnace is then controlled by varying the current flow in an auxiliary heating element 103. This is accomplished by the movements of rheostat 38 which is loosely mounted on shaft 11.

The temperature of the furnace is measured in the usual manner by a thermocouple 104, the electromotive force of which is adapted to be balanced against a potential difference across a portion of a resistance element 105. This latter potential difference is maintained constant by a potentiometer circuit comprising a battery 109, a fixed resistance 111 and a variable resistance 110 which is provided for adjusting the variation of the electromotive force of the battery 109. When the electromotive force of the thermocouple 104 is equal to the potential difference across the resistance element 105 between the point 112 and the sliding contact 114, no current will flow in a galvanometer 115 which is included in the thermocouple circuit. Whenever there is a difference between the electromotive force of the thermocouple 104 and the potential difference across the resistance element 105 between the point 112 and the sliding contact 114, a current will flow through the galvanometer and deflect a needle 116 either to the right or to the left, depending upon whether the electromotive force is larger or smaller than the potential difference across the portion of the resistance element 105 between the point 112 and the sliding contact 114. The deflection of the galvanometer needle 116 causes a rotation of the shaft 11 to adjust the sliding contact 114 until the balance is again established.

The mechanism for causing the adjustment of the rheostat 105 in accordance with the deflection of the galvanometer needle 116 is illustrated in detail in Fig. 4 in which the needle 116 is shown resting upon a ledge 119 which rises from the center towards either end and terminates in a pair of projections 121 which limit the deflection of the needle. The ledge 119 is fixed to a U-shaped member 122 pivoted at 123 and carrying an arm 124, the lower end of which contacts with a cam 125 mounted on a shaft 126 which is continuously rotated by a motor 127 causing a rising and falling of the U-shaped member 122 and the ledge, imparting a similar movement to the end of the needle which rests thereupon. A resilient arm 128 engages a second cam 129 on the shaft 126 which tends to continuously move the arm toward and away from a disc 10. To the lower end of the arm 128 is pivoted a cross arm 132 which carries a pair of shoes 133 adapted to frictionally engage the disc 10 when the arm 128 is moved toward the disc. The cross arm 132 terminates in a pair of projections 134 located in such a position that a pair of rotating cams 135 will not normally strike them. A plate 136 is fixed to the cross arm 132 and carries a pair of pins 137 which are engaged by arms 138 held in engagement with the pins by means of springs 140. The arms 138 are pivoted at 139 and are provided with projections 141. When the galvanometer needle is deflected it will tend to pass under one of the projections 141 and upon the rising of the member 122 the projection 141 will be raised, moving the arm 138, causing it to displace the plate 136 and pivot the arm 132 about its center. At this time the cam 129 will act to allow the shoes 133 to frictionally engage the disc 10, and as the cam 135 is rotated it will engage the projection 134 to return it to its normal position and carry the disc 10 with it, thereby rotating a shaft 11 to adjust the resistance 105 to such a value as to cause the galvanometer needle to return to its central position, indicating that the voltage of the thermocouple is equal to the potential difference across the portion of the resistance element 105 between the point 112 and the sliding contact 114.

It will be understood that the invention is not limited to the particular forms of input and output mechanisms illustrated and that it may be applied to any of the well known types of apparatus now in use for control purposes without departing from the spirit of the invention.

What I claim is:

1. An automatic system for producing or maintaining a predetermined condition as temperature, pressure, etc., comprising means responsive to departure from said predetermined condition, means for applying an agent for producing or maintaining said condition and timing means independent of said first named means for varying the application of said agent at a rate which is a function of the rate of change from or to said predetermined condition.

2. In a control device, an input and an output, means for moving said input, a cam cut in accordance with the total deviation from normal of said input, a cam cut in accordance with the deviation of said input per unit of time, and means operated in accordance with conjoint movements of said cams to effect movement of said output.

3. In an anticipatory control system an input and an output, said input comprising means responsive to variation of a measured condition, a cam cut in sense and to extent depending upon the sense and magnitude of total of said variations, a member riding on said cam, a second cam cut in sense and magnitude of the variation in any one unit of time, a second member riding on said second cam, said two members cooperating to move said output.

4. In a control system, an input subjected to variable stresses, an output, a connection between the input and the output to operate the latter in accordance with the stresses applied to the former, means for operating the output additionally to compensate for lag in the system, and a timing device for variably controlling the last mentioned means whereby the lag compensation is varied depending on the timing of stress changes in the input.

5. In a control system an input and an output, said input comprising means responsive to variations of a measured condition, a cam cut in sense and to extent depending upon the sense and magnitude of said variations, a member riding on said cam, said rider being associated at regular time intervals with said output mechanism to operate the latter.

6. In a control system an input and an output, said input comprising means responsive to variations of a measured condition, a cam cut in sense and to extent depending upon the sense and magnitude of said variations, a member riding on said cam, said member operating with said output mechanism and means for associating said cam at uniform periods of time with said input.

7. In a control system an input and an output, said input comprising means responsive to variations of a measured condition, a cam having constant connection with said input, said cam cut in sense and to extent depending upon the sense and magnitude of said variations, a member riding on said cam, said rider being associated periodically with said output mechanism to operate the latter.

8. In an anticipatory control system an input and an output, said input comprising means responsive to deviation from a normal condition, a member counting off the number of degrees deviation from normal, a cam associated with said member, a second member periodically associated with said first member and moved by it, means for returning said second member to normal after each period, a second cam associated with said second member upon its return movement and means for moving said output under the control of the two said cams.

9. In an anticipatory control system, an input and an output, said input comprising means responsive to variations of a measured condition, an integrating member engaging with said output, a cam cut in sense and to extent depending upon the sense and magnitude of the total of said variations, said cam having engagement with said member, a second cam cut in sense and to extent depending upon the sense and magnitude of the variation in any one unit of time, said second cam also having engagement with said member and means for moving said output in accordance with the combined movements of said first and second cams operating through the medium of said member.

10. In a control device an input and an output, means for moving said input, an integrating member, a cam cut in accordance with the total deviation from normal of said input, a cam cut in accordance with the deviation of said input per unit of time, means for moving said member in accordance with the conjoint movements of said cams to effect movement of said output.

11. The method of temperature control which consists in producing an effect which is a function of the summation of a plurality of rates of temperature change and of the departure of the temperature from a predetermined magnitude and controlling by said effect and during the producing thereof the application of heat for varying the temperature.

12. The method of producing or maintaining a predetermined temperature, which consists in producing an effect whose magnitude is representative of the temperature, simultaneously producing an effect whose magnitude is representative of the rate of change of temperature, effecting a flow of heat for varying the temperature, and causing said effects to co-act in controlling the rate of heat flow, the magnitude of both said effects being independent of the time required for their production.

13. The method of producing or maintaining a predetermined temperature, which consists in producing through a single test, a first effect whose magnitude is representative of the temperature, a second effect whose magnitude is representative of the rate of change of temperature, effecting a flow of heat for varying the temperature, and causing said first and second effects to co-act during said test independent of the element of time in controlling the rate of heat flow.

14. The method of producing or maintaining a predetermined temperature, which consists in producing an effect whose magnitude represents an integration of the temperature and the summation of a plurality of rates of change of temperature, effecting a flow of heat for varying the temperature and causing said effect to control the rate of heat flow.

15. In a control system adapted to maintain a medium in a predetermined condition which comprises a testing element, a control element, a first member capable of assuming a position corresponding to any deviation of the medium with respect to the predetermined condition, a second member capable of assuming a position corresponding to the rate of any deviation, means for conjointly operating said first and second members during a predetermined period of time, and a third member positioned by the combined positions of said first and second members to operate said control element.

16. A control system according to claim 15 and in which said last mentioned means conjointly operating said first, second and third members during a predetermined period of time.

17. A control system according to claim 15 and in which said last mentioned means conjointly operating said first, second and third members and said control element during a predetermined period of time.

18. The method of control tending to maintain a quantity at a predetermined value which comprises measuring during predetermined periods all deviations of said quantity with respect to said predetermined value during the occurrence of said deviation, exerting during said periods regulating effects which tend to return said quantity to said predetermined value on all departures therefrom, each regulating effect being the resultant of two factors, one of which represents the magnitude of a measured value of said quantity and the other of which represents the rate at which said deviations take place.

19. The method of control according to claim 18 and in which the measuring and the exerting of regulating effects take place simultaneously.

20. The method of control according to claim 18 in which said regulating effect is continuously exerted while said measuring takes place.

21. The method of control tending to maintain a quantity at a predetermined value which comprises measuring during predetermined periods deviations of said quantity from said predetermined value, continuously and without interruptions during said periods exerting regulating effects which tend to return said quantity to said predetermined value on departures therefrom, each regulating effect being the resultant of two factors, one of which represents the magnitude of a measured value of said quantity and the other of which represents the rate at which said deviations take place.

22. The method of control according to claim 21 and in which the measuring and the exerting of regulating effects take place simultaneously.

23. The method of control for maintaining a quantity at a predetermined value which consists in successively measuring the value of said quantity at regularly timed successive intervals and coincidentally exerting successive regulating effects tending to bring said quantity to the predetermined value when different from the latter, and each of which is a function of the departure of said quantity from its predetermined value and of the rate of change in said value.

24. The method of control tending to maintain a quantity at a predetermined value which consists in successively measuring the value of said quantity at time-controlled successive intervals and exerting successive regulating effects tending to bring said quantity to the predetermined value when different from the latter and each of which is a function of the departure of said quantity from its predetermined value and of the rate of change in said value, said rate correction having an increasing magnitude in proportion to the extent of departure, said measuring and said regulating effects occurring during the same single units of time.

25. The method of control tending to maintain a quantity at a predetermined value which consists in measuring said quantity at regularly timed intervals and simultaneously with said measuring exerting regulating effects which tend to return said quantity to said predetermined value on a departure therefrom and each of which is the resultant of two factors one of which is dependent on whether there is an increase or a decrease between two successively measured values of the quantity, and the other of which is dependent on the presence of a difference between one of said values and said predetermined value.

26. An automatic system for producing or maintaining a predetermined condition, as temperature, pressure, etc., comprising means responsive to departure from said predetermined condition, means for applying an agent coincidentally with said response for producing or maintaining said condition, and means controlled by said first named means for varying the application of said agent at a rate which is a function of the rate of change from or to said predetermined condition.

27. A mechanism adapted to maintain a medium in a predetermined condition which comprises a testing element, a control element, a member capable of assuming a position corresponding to the deviation of said medium from said condition, a second member capable of assuming a position corresponding to the rate of said deviation, a third member positioned by the combined positions of said first and second members, said third member acting to operate said control element, and means for causing said first, second and third members and said control to function coincidentally.

28. A mechanism for the control of a medium subject to deviation from a predetermined value comprising a first cam positioned in accordance with the deviation, a second cam positioned in accordance with the rate of deviation, an integrating member, a control means, and means for continuously associating said member and said control means and said first and second cams with said member in order to effect said control.

29. In a control mechanism, a first element moved in accordance with changes in a condition under control, a second element, means for periodically moving said second element from normal to a position corresponding to the deviation of said first element, means for restoring said second element to normal position, a first member moved by said first element, and a second member moved by said second element, said first and second members conjointly moving said control mechanism to effect said control.

30. A control mechanism comprising means responsive to variations in a medium to be controlled, a control means, a first cam moved to a position corresponding to a total of said variations, a member moved to a position corresponding to the instantaneous value of said variation and returned to normal, and a second cam moved by said member during said return to normal, said first and second cams cooperating with said control means to effect said control.

31. A control mechanism comprising means responsive to departure from a desired condition of a medium under control, a control means, a first cam rotated to a position representing a total of successive departures, a member rotated to a position representing a single departure and returned to normal, and a second cam rotated by said member during said return to normal, said first and second cams cooperating with said control means to effect said control.

32. A control mechanism comprising means responsive to variations in a medium to be controlled, a control means, a first member positioned in accordance with the movements of said means, a cam positioned in accordance with the movement of said first member, a second member periodically moved by said first member and returned to normal, a second cam positioned by the movement of said second member during said return to normal, said first and second cams cooperating with said control means to effect said control.

33. In a control mechanism a primary element responsive to deviations in a condition under control, a first member, means for periodically moving said first member from normal to a position corresponding to the deviation of said element, means for restoring said member to normal, a second member moved by said first member during said first mentioned movement, a third member moved by said first member during said restoring movement, and means for operating said control by the conjoint movements of said second and third members.

34. A control mechanism comprising movable means responsive to variations in a medium to be controlled, a first member positioned in accordance with the movements of said means, a first cam positioned in accordance with the movement of said first member, a second cam also positioned in accordance with the movement of said first member, said first and second cams cooperating coincidentally with the positioning of said cams to effect said control, and means for periodically restoring said second cam to normal position.

35. A control mechanism comprising means responsive to variations in a medium to be controlled, a first cam positioned in accordance with the total of said variations, a second cam positioned in accordance with the rate of said variations, said first and second cams cooperating simultaneously with the positioning of said cams to effect said control.

36. The method of control tending to maintain a quantity at a predetermined value which consists in successively measuring the value of said quantity and at time controlled successive intervals exerting successive regulating effects tending to bring said quantity to the predetermined value when different from the latter and each of which is a function of the departure of said quantity from its predetermined value and of the rate of change in said value; said departure correction and said rate correction, each independently of and coincidentally with the other, increasing the effect in magnitude in increasing proportion as the extent of departure increases.

37. In a control system, an input and an output, means for moving said output to any position corresponding to the position of said input, and means for coincidentally moving said output an additional amount equal to the rate per unit of time that said input is moving in any direction plus the lag in said system.

38. That method of maintaining a controllable condition substantially constant which is characterized by measuring said condition, creating and maintaining a governing force controlled by the measurement and variations of said condition which is maintained proportional at all times to the algebraic sum of the change and the rate of change of the condition, and continuously applying said governing force to control the condition.

ANITA S. REYNOLDS.